H. A. LARSON.
CONTROLLING DEVICE FOR GOVERNORS.
APPLICATION FILED APR. 9, 1908.

907,823.

Patented Dec. 29, 1908.

Witnesses

Inventor
Harry A. Larson.
By
Attorneys

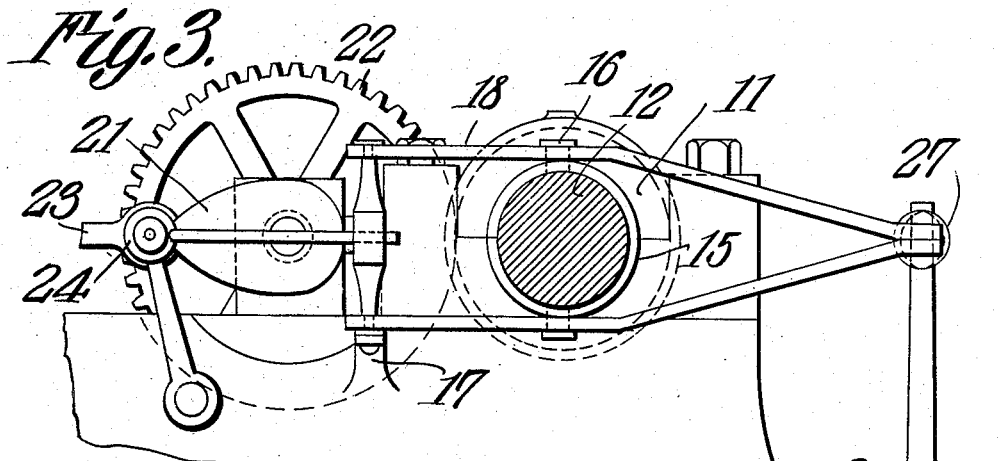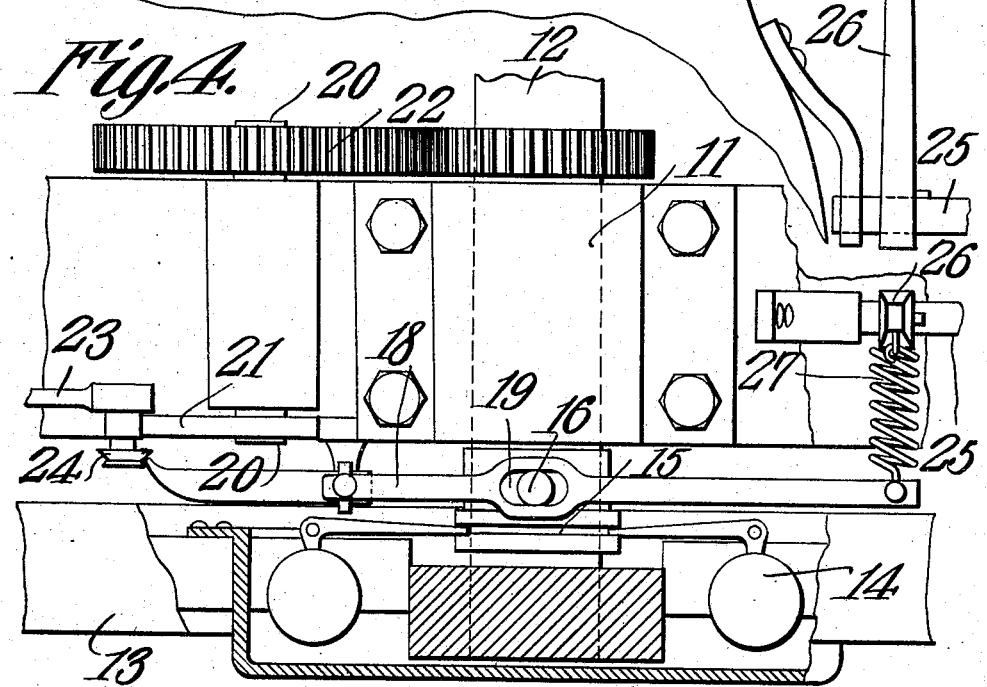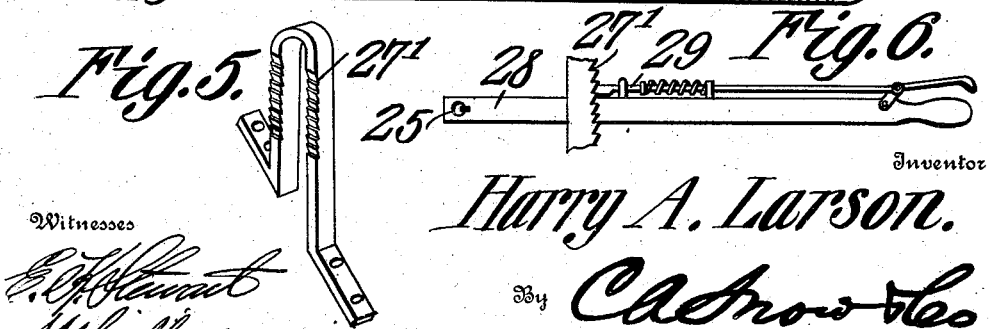

H. A. LARSON.
CONTROLLING DEVICE FOR GOVERNORS.
APPLICATION FILED APR. 9, 1908.
907,823.
Patented Dec. 29, 1908.
3 SHEETS—SHEET 3.
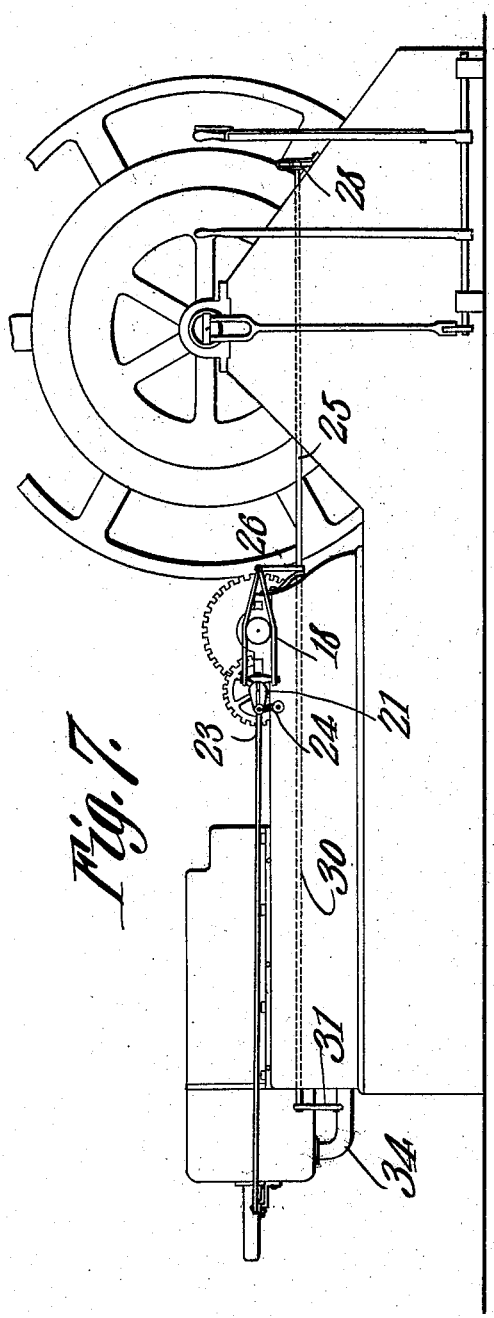
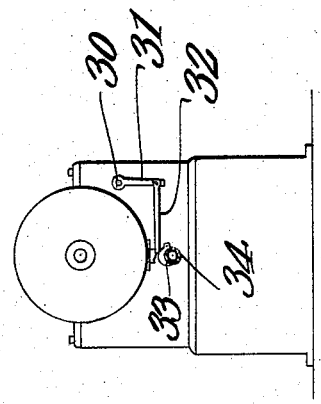
Witnesses
Inventor
Harry A. Larson.
By C. A. Snow & Co.
Attorneys

UNITED STATES PATENT OFFICE.

HARRY A. LARSON, OF PIOCHE, NEVADA.

CONTROLLING DEVICE FOR GOVERNORS.

No. 907,823.

Specification of Letters Patent.

Patented Dec. 29, 1908.

Application filed April 9, 1908. Serial No. 426,137.

*To whom it may concern:*

Be it known that I, HARRY A. LARSON, a citizen of the United States, residing at Pioche, in the county of Lincoln and State of Nevada, have invented a new and useful Controlling Device for Governors, of which the following is a specification.

This invention relates to devices for controlling governing mechanisms, and more especially to those designed to control the governing mechanism of internal combustion engines.

The object of the invention is to provide means for controlling the governor of an internal combustion engine so as to reduce the speed of the engine while it is running without a load, and thus reduce the consumption of motive fluid, said means being also designed to increase the speed of the engine as soon as said engine is subjected to a load, the governor itself taking care of any slight variation in the load and maintaining the speed uniform.

The invention consists in certain novel features of construction and arrangement of parts, hereinafter fully described, illustrated in the accompanying drawings, and specifically claimed.

Figure 1:
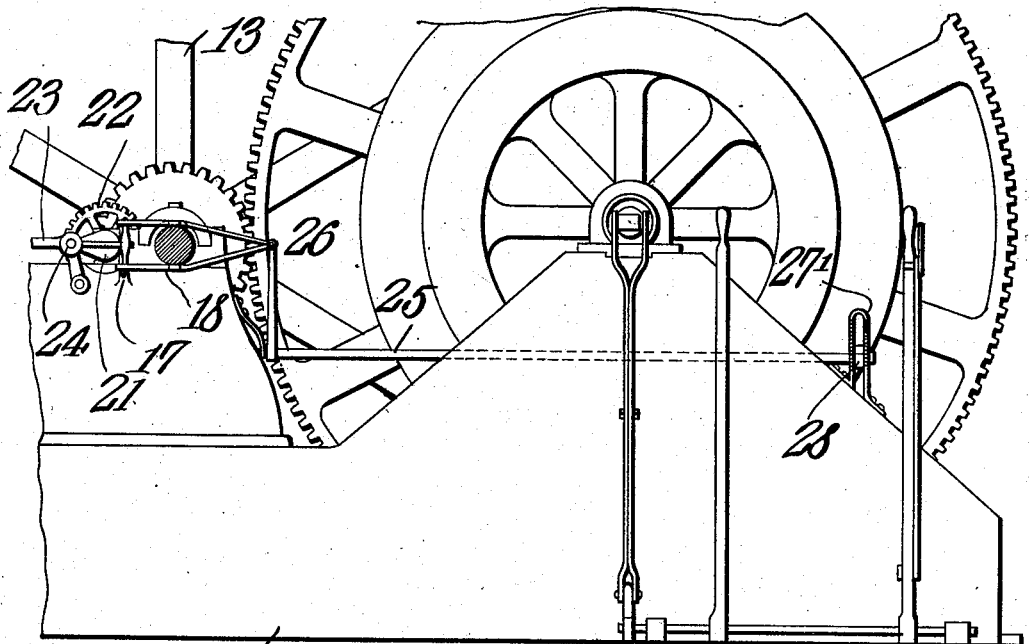
Figure 2:
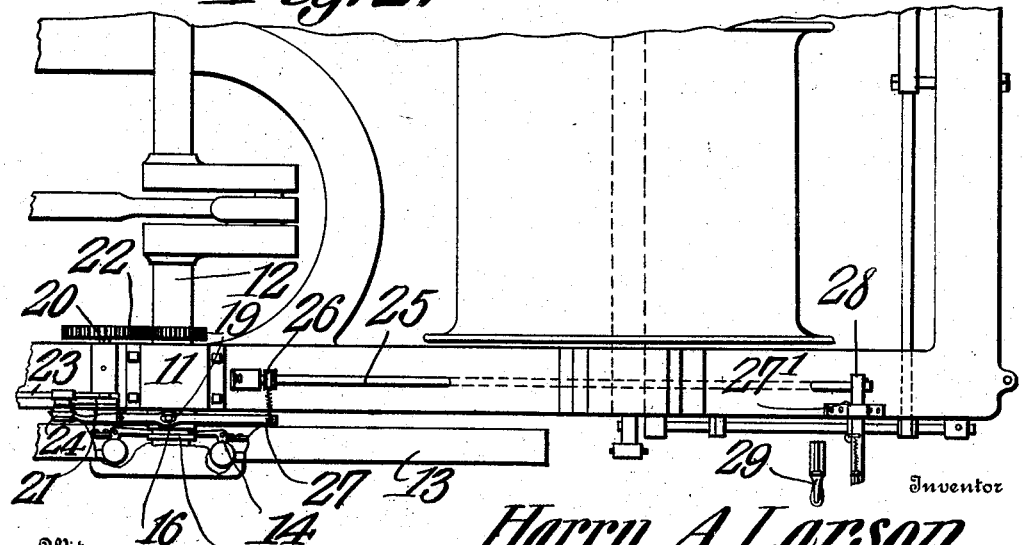

In the accompanying drawings:—Figure 1 is a partial side elevation of an engine with the device applied thereto. Fig. 2 is a plan view of the same. Fig. 3 is an enlarged detail side elevation of certain of the parts. Fig. 4 is a plan view of Fig. 3. Fig. 5 is a detail perspective of the quadrant. Fig. 6 is a detail view of a portion of the quadrant and the latch lever. Fig. 7 is a side elevation of a modification of my device showing an arrangement for controlling the air supply by the governor lever. Fig. 8 is an end view of this modification.

Similar numerals of reference are employed to indicate corresponding parts throughout the several figures of the drawings.

It is to be noted that the device is here shown as applied to a gasolene hoisting engine, this being typical of the class of engines on which it is found economical to vary the rate of speed according as the engine is running loaded or light. Engines of this class have hitherto been provided with a positive acting device to temporarily throw the governor out of service when it was desired to speed up the engine. This has been found not to answer the purpose inasmuch as the variation of speed thus obtained is comparatively slight, the speed being raised from two hundred to three hundred revolutions, and there being no provision for reducing the speed less than two hundred revolutions.

The present invention provides a means whereby the speed may be varied from the maximum to the minimum of not over fifty revolutions in this particular type of engine.

It is to be understood that the device may be applied to other engines with equally efficacious results.

The numeral 10 indicates the bed of the engine. In the bearings 11 thereon is carried a crank shaft 12. On the crank shaft 12 is held a fly wheel 13 carrying centrifugally actuated governing elements, here shown in the form of weighted bell crank levers 14. Mounted upon the shaft 12 is a sleeve 15 provided with a groove or other connection for the end of the centrifugally actuated elements and trunnions 16. Upon a bracket 17 is pivotally mounted a lock out lever 18 provided with an elongated opening near the middle thereof, as shown at 19, arranged to fit over the trunnions 16. In the form of lever here shown, the same is arranged with two arms which extend on either side of and closely embrace the sleeve 15, but it is obvious that this form may be varied to meet the varying conditions of different engines. Mounted upon a short shaft 20 is a cam 21 arranged to be rotated as the crank shaft rotates, by means of gears 22, on the crank shaft, and the short shaft. Held adjacent to and in the path of this cam is a bar 23. This bar 23 may be arranged to actuate the sparking mechanism, or a portion of the valve mechanism, or such other engine controlling means as may be found necessary, and the same is not to be taken as other than typical of an engine controlling means actuated from the cam.

In order to stop the operation of the bar 23 when the speed of the device increases to a point beyond that desired, there is provided a stop 24 arranged to contact with the end of the lock out lever 18, when the same is moved inwardly by the outward motion of the sleeve 15. Now, it will be observed that as soon as the fly wheel begins to rotate, the balls 14 will tend to move apart and move the sleeve 15 in such position that the end of the lever 18 will contact with the stop 24. To overcome this tendency, and to regulate the same, there has been provided a rock shaft 25 having a rocker arm 26, at the end thereof, adjacent the crank shaft, said rocker arm being so arranged as to lie opposite the free end of the lever 18. A spring 27 is attached to the rocker arm and the free end of the lever. At a convenient point on the machine, preferably between the clutch and brake lever, is mounted a quadrant 27'. Upon the rock shaft 25 is carried an operating lever 28 provided with a latch 29 adapted to coact with the quadrant 27' and hold the hand lever in the desired position. By means of this lever the tension of the spring 27 may be varied, as desired, and it will be noted that when the spring 27 is held under a high degree of tension, the balls 14 will be held from moving apart, and, therefore, the end of the lever 18 will remain out of the path of the stop 24 and the sparking mechanism or other controlling device will continue to operate until the speed reaches a point at which the centrifugal effort of the balls will overcome the tension of the spring. If, however, it be desired to lower the speed of the engine, the tension of the spring 27 may be relaxed by moving the hand lever down, and it will be obvious that when this tension is relaxed, the balls 14 will more readily move apart and the bar 23 will be held from actuation during a greater portion of the time. It is thus seen that the speed of the engine is completely under the control of the operator, since any desired degree of tension may be obtained in the spring 27, while the engine is running, by the simple movement of the hand lever 28.

In the modified form of device shown in Figs. 7 and 8, the rod 25 is continued, as shown at 30, through the engine bed. Upon the end of this rod is fixedly mounted a lever 31 carrying a link 32. The link 32 is connected to a valve 33 in the air pipe of the engine, as indicated at 34. It will be observed that, by means of this arrangement, the operation of the lever 28 will not only serve to actuate the governing mechanism, but will also serve to control the admission of air to pipe 34.

It is obvious that many minor changes in the form and construction of the device may be made without departing from the principles of the same, and it is not, therefore, desired to be confined to the exact form herein shown and described, but to include all such as properly come within the scope of the invention.

What is claimed is:—

1. In a device of the kind described, a pivotally mounted lock out lever, a governor arranged to vary the position of said lever, a spring attached to said lever, an air valve, and means attached to said spring to vary the tension thereof and actuate said air valve.

2. In a device of the kind described, a rotary member, a sleeve slidably mounted thereon, a centrifugally actuated element arranged to vary the position of said sleeve on said rotary member, a pivotally mounted lock out lever arranged to be moved by said sleeve, a spring attached to said lever, an air valve and means attached to said spring to vary the tension thereof and actuate said air valve.

3. In a device of the kind described, a rotary member, a sleeve slidably mounted thereon, a centrifugally actuated element arranged to vary the position of said sleeve on said rotary member, a pivotally mounted lock out lever arranged to be moved by said sleeve, a rock shaft, a rocker arm attached to said rock shaft, a spring held between said lever and said rocker arm, an air valve manually operated means to rotate said rock shaft and operating said air valve, and a locking device for said means.

4. In a device of the kind described, a rotary member, a sleeve slidably mounted thereon, a centrifugally actuated element arranged to vary the position of said sleeve on said rotary member, a pivotally mounted lock out lever arranged to be moved by said sleeve, a rock shaft, a rocker arm attached to said rock shaft, a spring held between said lever and said rocker arm, an air valve a latch lever carried on said rock shaft to rotate said shaft, vary the tension of said spring and operate said air valve, and a quadrant arranged in the path of said latch lever.

5. In a device of the kind described, a rotary member, a sleeve slidably mounted thereon, a centrifugally actuated element arranged to vary the position of said sleeve on said rotary member, a pivotally mounted lock-out lever arranged to be moved by said sleeve, a rock shaft, a rocker arm attached to said rock shaft, a spring held between said lever and said rocker arm, a second rocker arm, an air valve means to attach said second rocker arm to the air valve, and manually operated means to rotate said rock shaft and actuate said air valve.

6. In a device of the kind described, a rotary member, means slidably mounted thereon, a pivotally actuated element arranged to vary the position of said sleeve on said rotary member, a pivotally mounted lock-out lever arranged to be moved by said sleeve, a rock shaft, a rocker arm attached to said rock shaft, a spring held between said lever and said rocker arm, a second rocker arm attached to said rock shaft, an air valve controlled by the movement of said rocker arm, manually operated means to rotate said rock shaft, and a lock device for said means.

In testimony that I claim the foregoing as my own, I have hereto affixed my signature in the presence of two witnesses.

HARRY A. LARSON.

Witnesses:
F. R. LEVI,
S. A BRINTON.